United States Patent [19]
Muller

[11] Patent Number: 5,136,485
[45] Date of Patent: Aug. 4, 1992

[54] LENS AND BEZEL ASSEMBLY WITH UNIFORM SURFACE TEXTURING AND COLOR

[75] Inventor: Robert Muller, Royal Oak, Mich.

[73] Assignee: United Technologies Automotive Inc., Dearborn, Mich.

[21] Appl. No.: 580,974

[22] Filed: Sep. 12, 1990

[51] Int. Cl.$^5$ .................................... B60Q 11/00
[52] U.S. Cl. .................................... 362/74; 362/83.3
[58] Field of Search ............... 116/35 R, 45; 340/463, 340/475, 479; 362/61, 74, 80, 81, 82, 83, 83.3, 311, 326, 330, 307, 308, 309

[56] References Cited

U.S. PATENT DOCUMENTS

| | | | |
|---|---|---|---|
| 4,485,523 | 12/1984 | Higgins | 362/74 |
| 4,654,761 | 3/1987 | Walsh | 362/80 |
| 4,849,861 | 7/1989 | Arima | 362/61 |
| 4,851,810 | 7/1989 | Vitale et al. | 362/61 |
| 4,860,174 | 8/1989 | Kato et al. | 362/61 |
| 4,972,302 | 11/1990 | Masuyama et al. | 362/61 |

*Primary Examiner*—Ira S. Lazarus
*Assistant Examiner*—Sue Hagarman

[57] ABSTRACT

In automotive interior lamp assemblies, the exposed surfaces of both a bezel (18) and a lens (20) are stippled with a pattern chosen to complement the texture of the material (15) surrounding the bezel. Additionally, the color of the bezel (18) is substantially identical to the color of the lens (20) when the lamp assembly is extinguished.

5 Claims, 1 Drawing Sheet

LENS AND BEZEL ASSEMBLY WITH UNIFORM SURFACE TEXTURING AND COLOR

TECHNICAL FIELD

This invention relates to lamp assemblies with internal light sources.

BACKGROUND ART

For passenger safety and convenience, most automobile interiors are equipped with lamp assemblies. The bulbs, structural frames, parabolic reflectors and wiring components comprising these lamp assemblies are typically recessed into cavities in the automobile headliner, door panels, and other interior surfaces, allowing them to be completely covered by a bezel and lens assembly. In most applications, the lens is a generally planar member, tinted or frosted both to diffuse light and to hide the recessed components. To focus, instead of diffuse light, while still hiding the recessed components, some lenses have a Fresnel surface on the interior lens face. The bezel, most often manufactured of metal or opaque plastic, serves both as a frame for the lens and as a styling means to visually and texturally blend the typically smoother exterior lens surface with the coarser fabric material often covering the surrounding mounting surface.

For aesthetic purposes, the outside surface of the lens is often polished. Although providing for satisfactory illumination, these polished lenses are very susceptible to scratching, and are therefore more costly to store and handle during manufacture, than unpolished lenses. Furthermore, when installed in automobile interiors and subjected to normal wear, these delicate polished surfaces become scratched and nicked, losing both their luster and their aesthetic appeal.

DISCLOSURE OF INVENTION

Objects of the present invention include providing a lamp bezel and lens assembly that is scratch-resistant, hides internal lamp components, and aesthetically complements both the texture and color of a surface surrounding the bezel.

According to the present invention, the exterior surfaces of both a lens and surrounding bezel are stippled to yield a raised, knobby texture.

In the preferred embodiment of the present invention, the interior surface of the lens has a Fresnel surface allowing the light beam to be focused, and the color of the bezel is identical to the color of the lens when the internal lamp light is extinguished.

The foregoing and other objects, features, and advantages of the present invention will become more apparent in the light of the following detailed description of exemplary embodiments thereof, as illustrated in the accompanying drawings.

BEST MODE FOR CARRYING OUT THE INVENTION

Fixtures that illuminate automobile interiors typically employ polished lenses framed by opaque bezels to hide and protect the internal structural and optical components within the fixture. However, these smooth, polished, lenses are not only susceptible to scratching during both manufacture and use, but also provide often undesirable textural and chromatic contrast with the surrounding interior materials. To enhance the durability and aesthetic appeal of an automotive interior, the present invention comprises a lamp and bezel assembly that is both scratch-resistant and textured and tinted to yield a uniform external surface more easily blended into surrounding surfaces.

Figure 1:
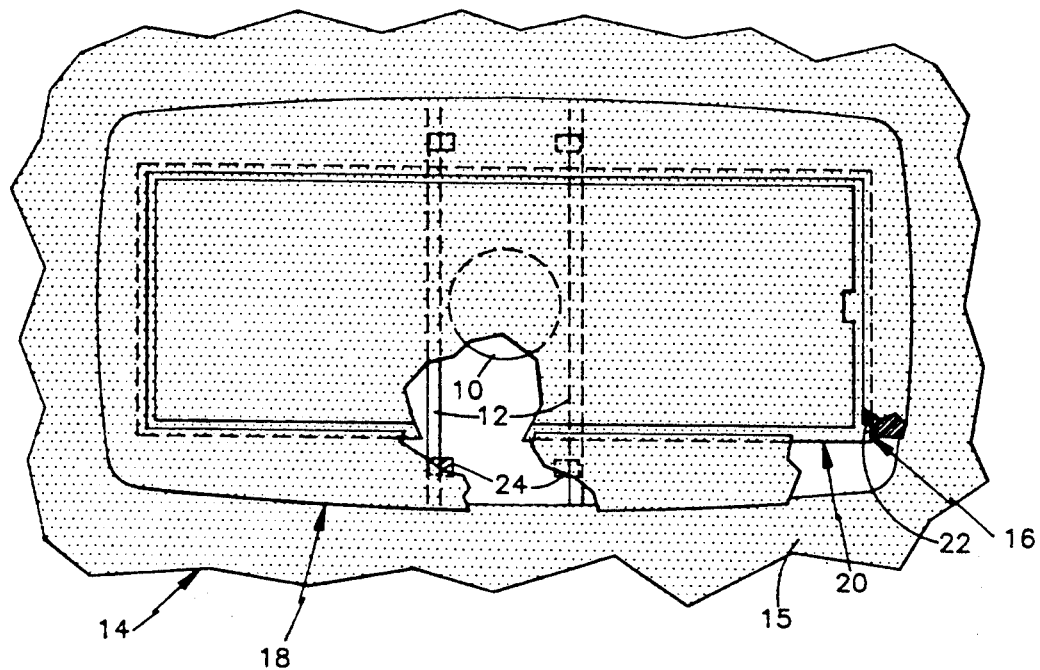
FIG. 1 is a plan view of a lamp fixture assembly installed in the automobile interior.

Referring now to FIG. 1, an incandescent bulb 10, wiring (not shown), parabolic reflector (not shown), and mounting bracket 12 are completely recessed into a cavity in an automobile headliner 14. The headliner 14 has a structural core formed from polystyrene foam and covered with colored material 15. Although this material 15 may be any suitable substance, generally vinyl, fabric, or carpeting is used. The color of the chosen material is selected to best match or complement the color of the remainder of the interior. For instance, if the remainder of the interior is red or grey, the material 15 may be the same or different shades of red or grey.

In order to protect and hide the internal bulb 10, wiring, reflector, and bracket 12, a bezel and lens assembly 16 covers the cavity in the headliner 14. The bezel 18, a frame composed of opaque acrylonitrile butadiene-styrene (ABS), has exterior dimensions slightly greater than the dimensions of the cavity in the headliner, and a rectangular aperture for receiving the lens 20. The lens 20, a planar member composed of polycarbonate, fits into a depression created by a shoulder 22 traversing the edge of the rectangular aperture in the bezel. Snap fittings 24, integrally formed with the hidden face of the bezel 18, mate with flanges on the bracket 12, sandwiching the lens 20 between the shoulder 22 and the bracket 12, and locating the bezel and lens assembly 16 with respect to both the headliner 14 and the internal components.

The exposed surface of the bezel 18 is stippled and unpolished, yielding a raised, knobby texture with a mean depth ranging from 0.0005" to 0.005". In the preferred embodiment, the depth of the stippling is chosen to complement the texture of the material 15 surrounding the bezel. A stippling with a mean depth of 0.001" is used on a bezel 18 installed adjacent to vinyl. As they generally have a coarser hand, fabric and carpet-covered headliners 14 require bezels stippled to mean depths of 0.002" and 0.003", respectively.

Stippling provides a means to integrate the bezel 18 with the texture of the surrounding material 15. To complete this integration, the bezel 18 is tinted to best complement the color of the surrounding material 15. For instance, if the surrounding material 15 is some shade of red or grey, the bezel 18 may be the same or other shades of red or grey.

The exposed surface of the lens 20 is unpolished and stippled to the same depth, and with the same pattern, as the bezel 18, improving its durability and scratch-resistance. With this treatment, the surface texture of the bezel and lens assembly 16 is uniform. For uniform color, the lens 20 is tinted so that, when the incandescent bulb 10 is extinguished, the color of the lens is generally identical to the color of the bezel 18. For instance, if the bezel 18 is a shade of grey or red, the installed lens 20 is the same shade, when the bulb 10 is not lit, of grey or red. With the fixture off, therefore, it is difficult to distinguish the bezel 18 from the lens 20.

When the fixture is lit, as the degree of tinting is slight, the lens is a much lighter shade, only slightly coloring the light passing through it. As this colored light is a shade similar to light reflected off the interior surfaces, the tinting is, for the most part, unnoticeable.

Figure 2:
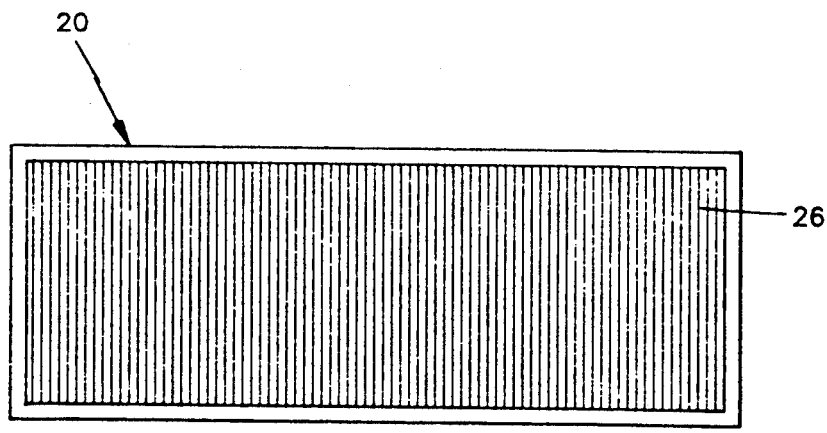
FIG. 2 is a plan view of a hidden surface of a lamp fixture lens.

Laboratory testing of the present invention shows that stippling the lens 20 in the aforementioned fashion scatters light which passes through it. In some applications, scattering of the slight degree observed is desirable. Referring now to FIG. 2, in applications where scattering is not desirable, the hidden face of the lens 26, the face disposed toward the bulb, has a Fresnel surface. The optical properties of this Fresnel surface are selected both to correct for the slight scattering caused by the stippling and to focus the light beam to illuminate better, a desired region of the interior.

Although the invention has been shown and described with respect to exemplary embodiments thereof, it should be understood by those skilled in the art that various changes, omissions, and additions may be made therein and thereto, without departing from the spirit and scope of the invention.

Having thus described the invention, what is claimed is:

1. In a motor vehicle interior lamp assembly comprising a light source in the interior of said assembly and a lens having a hidden face disposed toward said light source and an exposed face, opposite said hidden face, the improvement characterized by:

said exposed face having a stippled texture; and a bezel having an exposed surface which blends in texture with portions of said vehicle interior surrounding said bezel, and which is stippled with substantially the same pattern as said exposed surface of said lens so as to limit the visual prominance of said lens with respect to said vehicle interior.

2. The lamp assembly according to claim 1 wherein said bezel is of a color substantially identical to the color of said lens when said light source is extinguished.

3. The lamp assembly according to claim 1 wherein said hidden face of said lens has a Fresnel surface.

4. The lamp assembly according to claim 1 wherein said lens is manufactured from polycarbonate.

5. The lamp assembly according to claim 1 wherein said bezel is manufactured from acrylonitrile butadiene-styrene (ABS).

* * * * *